Oct. 12, 1954  E. THIELICKE  2,691,224
DIRECT READING MICROMETER
Filed Aug. 20, 1953
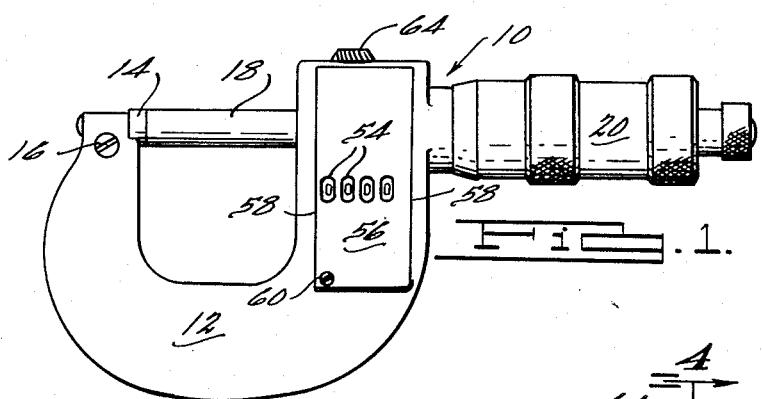
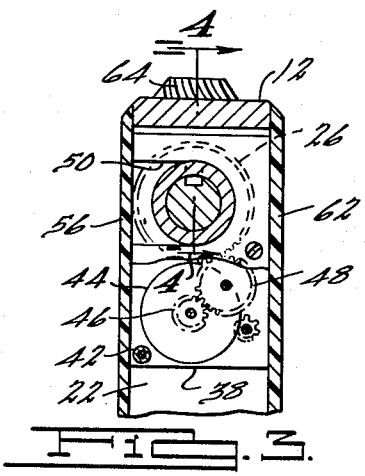
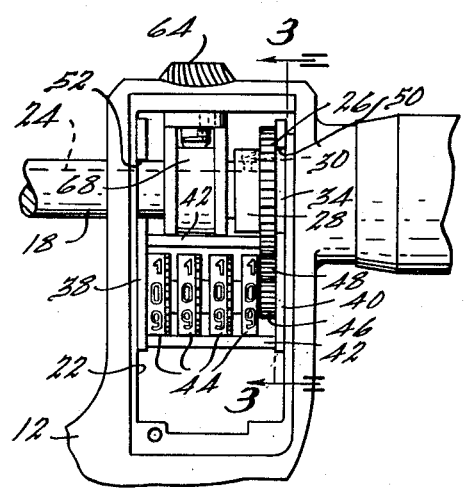
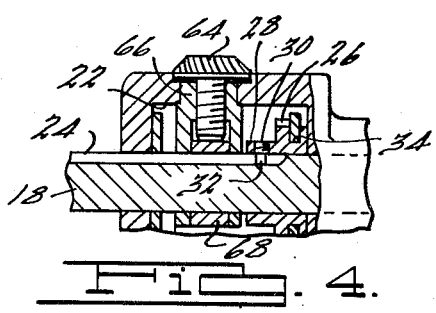
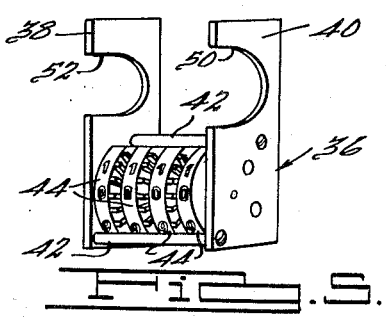
INVENTOR.
Ernst Thielicke.
BY
Harness, Dickey & Pierce
ATTORNEYS.

Patented Oct. 12, 1954

2,691,224

UNITED STATES PATENT OFFICE 2,691,224

DIRECT READING MICROMETER

Ernst Thielicke, Biel, Switzerland

Application August 20, 1953, Serial No. 375,319

3 Claims. (Cl. 33—166)

1

The present invention relates to measuring instruments, and particularly to a direct reading measuring instrument.

It is an object of the present invention to provide an improved direct reading measuring instrument such, for example, as a micrometer, which is simple in design, economical of manufacture and reliable and accurate in use.

Another object of the present invention is to provide an improved direct reading measuring instrument in which the movement of a spindle in effecting a measurement is accurately registered on a counter unit which may be completely and separately assembled and then readily moved into and out of assembled relation with the spindle mechanism.

More specifically, it is an object of the present invention to provide an improved direct reading micrometer in which the frame has a cavity through which the spindle extends and which receives a counter unit subassembly, the counter unit being properly positioned by co-operating engagement with the frame and spindle.

Other and more detailed objects of the present invention will be appreciated by those skilled in the art from a consideration of the following specification, the appended claims and the accompanying drawing wherein:

Figure 1 is an elevational view of a micrometer embodying the present invention;

Figure 2 is an enlarged fragmentary view of a portion of the construction illustrated in Figure 1 showing the cover plate removed;

Figure 3 is a sectional view of the structure illustrated in Figure 2, taken substantially along the line 3—3 thereof;

Figure 4 is a sectional view of the construction illustrated in Figure 3, taken substantially along the line 4—4 thereof; and, Figure 5 is a perspective view of the counter unit.

It will be readily appreciated from a complete understanding of the present invention that the improvements thereof may be embodied in measuring instruments of widely differing types and sizes. In an illustrative but not in a limiting sense, the improvements of the present invention are herein illustrated and described as embodied in a micrometer generally indicated by the reference character 10.

The micrometer 10 includes a frame 12 carrying an anvil 14 secured in place by a screw 16, and a spindle 18 which is moved toward and from the anvil 14 in taking measurements with the micrometer 10, by conventional means including a thimble 20. The frame 12 is generally

2

C-shaped and at the end thereof, opposite the anvil 14, has an enlarged portion in which is formed a generally rectangular cavity 22 through which the spindle 18 extends. The spindle 18 is provided with a longitudinally extending keyway 24 and carries a spur gear 26 disposed within the cavity 22 and having a hub portion 28 receiving a set screw 30, the inner end portion 32 of which is adapted to fit in and move longitudinally of the keyway 24. The gear 26 also has an annular groove 34 in its radially outer surface which co-operates as hereinafter described in maintaining the proper position of the gear 26.

The cavity 22 also receives a counter unit generally indicated at 36 and illustrated in Figure 5, which comprises two generally rectangular plates 38 and 40 which are interconnected and maintained in proper spaced relation by the posts 42. A conventional counter mechanism comprising four indicia wheels 44 is supported between the plates 38 and 40 and is driven through a spur gear 46 connected to the right-hand one of the wheels 44, as viewed in Figure 2. The plate 40 also carries a spur gear 48 in continuous mesh with and for driving the gear 46. The plate 40 also has a slot 50 having a semicircular inner end portion adapted to fit in the annular groove 34 and hold the gear 26 against movement transversely of the plate 40. The other plate 38 is provided with a similar but smaller slot 52 adapted to fit over the spindle 18 to co-operate in maintaining the counter unit 36 in proper position. The gear 48 is so located on the plate 40 that, when the counter unit 36 is moved into the assembled position illustrated in Figures 1, 2, 3 and 4 of the drawing, the gear 48 meshes with the gear 26. The gears 26, 46 and 48 may be so proportioned that the indicia on the wheels 44, exposed to view through the apertures 54 of the cover plate 56, indicate the distance of the outer end of the spindle 18 from the anvil 14 in any desired units such, for example, as thousandths of an inch or thousandths of a centimeter. The cover plate 56 is shown as having beveled edges 58 permitting it to be slid longitudinally into position and secured in place by a single screw 60.

Also, a cover plate 62 is mounted in the opposite side of the frame 12, as illustrated in Figure 3, to close the cavity 22 and co-operate with the cover plate 56 and the frame 12 to engage the plates 38 and 40 when the counter unit 36 is in proper assembled position, to hold the counter unit against movement relative to the frame 12. The micrometer is also provided with a thumb screw 64 which is mounted in a yoke 66 and the inner end of which may engage a sleeve 68. It will be appreciated that upon tightening of the thumb screw 64, a frictional load is applied to the spindle 18 to provide a desired adjustment of the resistance to rotation of the spindle 18 and hence, the thimble 20.

It is an important feature of the present invention that the counter unit 36 is a separate and independently complete subassembly which may be completely manufactured independent of the remainder of the micrometer or other measuring instrument. This greatly facilitates both the initial manufacture and any servicing or maintenance of the measuring instrument which may be found to be necessary.

Another feature of the present applicant's invention is that the counter unit is accurately and properly located relative to the spindle 18 and the gear 26 by the slots 50 and 52 provided in the plates 38 and 40, which receive the spindle 18 and the annular grooved portion of the gear 26 mounted on the spindle 18.

While only one specific embodiment of the invention has been illustrated and described in detail herein, it will be readily appreciated by those skilled in the art that numerous modifications and changes may be made without departing from the spirit of the invention.

What is claimed is:

1. A direct reading measuring device comprising a frame, a spindle mounted on said frame, means for moving said spindle axially for effecting measurements, a gear operatively connected to said means, a counter unit including a gear and indicia wheels operatively connected thereto, and means for supporting said unit with said gears in mesh, said counter unit being a complete subassembly including a pair of interconnected end plates supporting said gear and said indicia wheels operatively connected thereto, said plates having slots through which said spindle extends to co-operate in positioning the counter unit and which facilitate removal of the counter unit without disassembly thereof.

2. A direct reading micrometer comprising a frame, an anvil fixed on said frame, a spindle mounted on said frame, means for moving said spindle toward and from said anvil and including a thimble, said frame having a cavity through which said spindle extends, a gear mounted in said cavity and operatively connected to said means for rotation in response to operation of said means to effect movement of said spindle toward or from said anvil, and a counter unit disposed in said cavity and having a gear meshing with said first named gear and indicia wheels operatively connected to said last named gear, said first named gear being disposed coaxial with said spindle and having an annular groove in a radially outer surface thereof, said counter unit having a pair of interconnected plates supporting said indicia wheels and said second named gear, one of said plates having a slot receiving said spindle to co-operate in positioning said counter unit and the other of said plates having a slot substantially fitting said annular groove of said first named gear to co-operate in positioning said counter unit and to prevent movement of said first named gear axially relative to said second named gear.

3. A direct reading micrometer comprising a frame having a cavity, an anvil fixed on said frame, a spindle extending through said cavity, means mounted on said frame for rotating said spindle and moving it toward and from said anvil, a gear disposed in said cavity and connected to said spindle for rotation therewith and movement longitudinally thereof, said gear having an annular groove in its radially outer surface, a counter unit disposed in said cavity and comprising a pair of interconnected spaced plates, counter means including a plurality of indicia wheels mounted on said plates, and a counter gear supported on at least one of said plates and operatively connected to said counter means, said plates having slots receiving said spindle and groove of said gear respectively to co-operate in positioning said counter unit and facilitate movement of said unit into and out of assembled position in which said counter gear meshes with said first named gear, and cover means on said frame holding said counter unit in position in said cavity.

References Cited in the file of this patent

UNITED STATES PATENTS

| Number | Name | Date |
|--------|------|------|
| 981,127 | Scusa | Jan. 10, 1911 |
| 1,021,384 | Smith | Mar. 26, 1912 |